United States Patent
Ito

(10) Patent No.: US 10,067,807 B2
(45) Date of Patent: Sep. 4, 2018

(54) INFORMATION PROCESSING APPARATUS AND METHOD OF CONTROLLING INFORMATION PROCESSING APPARATUS

(71) Applicant: CANON KABUSHIKI KAISHA, Tokyo (JP)

(72) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/341,399

(22) Filed: Nov. 2, 2016

(65) Prior Publication Data

US 2017/0147414 A1 May 25, 2017

(30) Foreign Application Priority Data

Nov. 25, 2015 (JP) .................................. 2015-230027

(51) Int. Cl.
| | | |
|---|---|---|
| G06F 3/00 | (2006.01) | |
| G06F 9/44 | (2018.01) | |
| G06F 9/46 | (2006.01) | |
| G06F 13/00 | (2006.01) | |
| G06F 9/54 | (2006.01) | |

(52) U.S. Cl.
CPC .............. *G06F 9/541* (2013.01); *G06F 9/544* (2013.01)

(58) Field of Classification Search
None
See application file for complete search history.

(56) References Cited

U.S. PATENT DOCUMENTS

| | | | |
|---|---|---|---|
| 2007/0240136 A1* | 10/2007 | Garyali ................... | G06F 9/468 717/140 |
| 2008/0148298 A1* | 6/2008 | Chatterjee ............... | G06F 21/54 719/328 |
| 2011/0199645 A1 | 8/2011 | Ito | |
| 2012/0159310 A1* | 6/2012 | Chang ...................... | G06F 8/40 715/239 |
| 2012/0185796 A1* | 7/2012 | Tanaka ................... | G06F 9/4443 715/781 |
| 2016/0054985 A1* | 2/2016 | Cragun ..................... | G06F 8/38 715/762 |
| 2016/0105575 A1* | 4/2016 | Oshima .............. | H04N 1/00464 358/1.15 |

FOREIGN PATENT DOCUMENTS

JP 2012-234401 11/2012

* cited by examiner

*Primary Examiner* — Chat Do
*Assistant Examiner* — William C Wood
(74) *Attorney, Agent, or Firm* — Fitzpatrick, Cella, Harper & Scinto

(57) ABSTRACT

A native function bound to JavaScript is registered in API information 303, and by controlling to enable usage or disable usage of the native function in accordance with a display state of an application that uses WebView 302, it becomes possible to guarantee security of each application more simply.

8 Claims, 9 Drawing Sheets

FIG. 4

```
public class TestClass{
    public void changeAdminPwd(string pwd){
        .
        .
        .
    }
} webView.addJavascriptInterface( applicationid, url, new TestClass(),"Test");
```

FIG. 5

```
<input type="button" onClick="changePassword('123')" />
    .
    .
    .
<script type="text/javascript">
    function changePassword(string) {
      Test.changeAdminPwd( string );
    }
</script>
```

FIG. 6

| APPLICATION IDENTIFIER | URL | JAVASCRIPT | JAVA | BINDING STATE |
|---|---|---|---|---|
| 1111-2222-3333 | Http://appA.com/index.html | Function changePassword | TestClass | bind |
| 4444-5555-6666 | Http://appB.com/index.html | Function changeUserName | TestClass2 | unbind |
| ... | ... | ... | ... | ... |

FIG. 9

| APPLICATION IDENTIFIER | URL | JAVASCRIPT | JAVA | USAGE PERMISSION FLAG IN RELATION TO THE SAME ORIGIN | BINDING INFORMATION |
|---|---|---|---|---|---|
| 1111-2222-3333 | Http://appA.com/index.html | Function changePassword | TestClass | true | bind |
| 1111-2222-3333 | Http://appA.com/test.html | Function changePassword | TestClass | true | bind |
| 4444-5555-6666 | Http://appB.com/index.html | Function changeUserName | TestClass2 | false | unbind |
| ... | ... | ... | ... | ... | ... |

INFORMATION PROCESSING APPARATUS AND METHOD OF CONTROLLING INFORMATION PROCESSING APPARATUS

BACKGROUND OF THE INVENTION

Field of the Invention

The present invention relates to an information processing apparatus that is connected to a Web server, and comprises a Web browser for displaying an operation screen provided by the Web server, and a method of controlling an information processing apparatus.

Description of the Related Art

An information processing apparatus, such as a PC or a mobile telephone, connecting to a Web server on a network, and displaying operation screens, which are provided by a Web application on the Web server, on a Web browser that the information processing apparatus comprises is known. In such cases, firstly the Web browser of the information processing apparatus makes a request (requests) for an operation screen to the Web application on the Web server. Then, in response to the request from the information processing apparatus, the Web application makes a response (responds) to the information processing apparatus with HTML data for causing an operation screen to be displayed on the Web browser. The Web browser of the information processing apparatus analyzes the received HTML data, and displays the operation screen based on the description of the HTML data. When the user inputs an instruction via the operation screen displayed on the Web browser, the Web browser makes a notification to the Web server of the inputted instruction. Then, the Web application on the Web server, after receiving this notification, executes processing in accordance with the inputted instruction. Also, there is a component called a WebView that has a function that is equivalent to the foregoing Web browser function, and that can be used as a GUI element for configuring an application on an information processing apparatus. An application on the information processing apparatus can realize a function and representation equivalent to those of a Web browser by using a WebView. In recent years, the above described Web browser and WebView are being implemented in multifunction peripherals (MFPs) that comprise a scanner and a printer.

In WebViews, there are those that comprise a binding (bind/unbind) mechanism for calling a native function of an information processing apparatus directly from JavaScript (registered trademark) that is executed in the Web application. While the implementation of the application is simplified by using this binding mechanism, there is a necessity to consider safety measures against applications that would use the binding mechanism maliciously on the system side where the application is executed. Note that a native function indicates a function that an operating system, a language processor, or the like of the information processing apparatus provides.

As a safety measure of the system side, a threat is estimated by reverse compiling an application to identify a native function that is bound in the JavaScript (registered trademark) that is executed in that application (Japanese Patent Laid-Open No. 2012-234401).

However, in the conventional method, it is necessary to have an API storage mechanism for storing malicious APIs that could be a threat and the reverse compile mechanism. This makes the system more complicated. Along with this, in the conventional method, it is necessary to handle each application.

SUMMARY OF THE INVENTION

The present invention, depending on the state of an application, controls, by a simpler method, binding between a native function and JavaScript (registered trademark) using a WebView.

The present invention has the following configuration. According to an aspect of the present invention, there is provided an information processing apparatus that can provide a native function to a script obtained in an application being executed, the apparatus comprising: a storage unit configured to store a table that associates application identification information, a native function, and a binding state that indicates whether or not the native function is usable by the script obtained in the application; and a change unit configured to, when a state of display of a plurality of applications that are executed is switched, refer to the table to change the binding state associated with an application that transitioned from a displayed state to a non-displayed state to a value indicating that the native function is not usable, and change the native function to a state in which it is not usable by the script.

By virtue of the present invention, it becomes possible to guarantee security of each application more simply by controlling a binding state between JavaScript (registered trademark) and a native function in accordance with a state of an application using a WebView.

Further features of the present invention will become apparent from the following description of exemplary embodiments with reference to the attached drawings.

BRIEF DESCRIPTION OF THE DRAWINGS

FIG. 4 is a view illustrating a Java code example in the embodiment of the present invention.

FIG. 5 is a view illustrating a Javascript code example in the embodiment of the present invention.

FIG. 6 is a view illustrating an API information example in the embodiment of the present invention.

FIG. 9 is a view illustrating an API information extension example in the embodiment of the present invention.

DESCRIPTION OF THE EMBODIMENTS

Hereinafter, embodiments for working the present invention are explained using drawings.

First Embodiment

System Configuration Example

Figure 1:
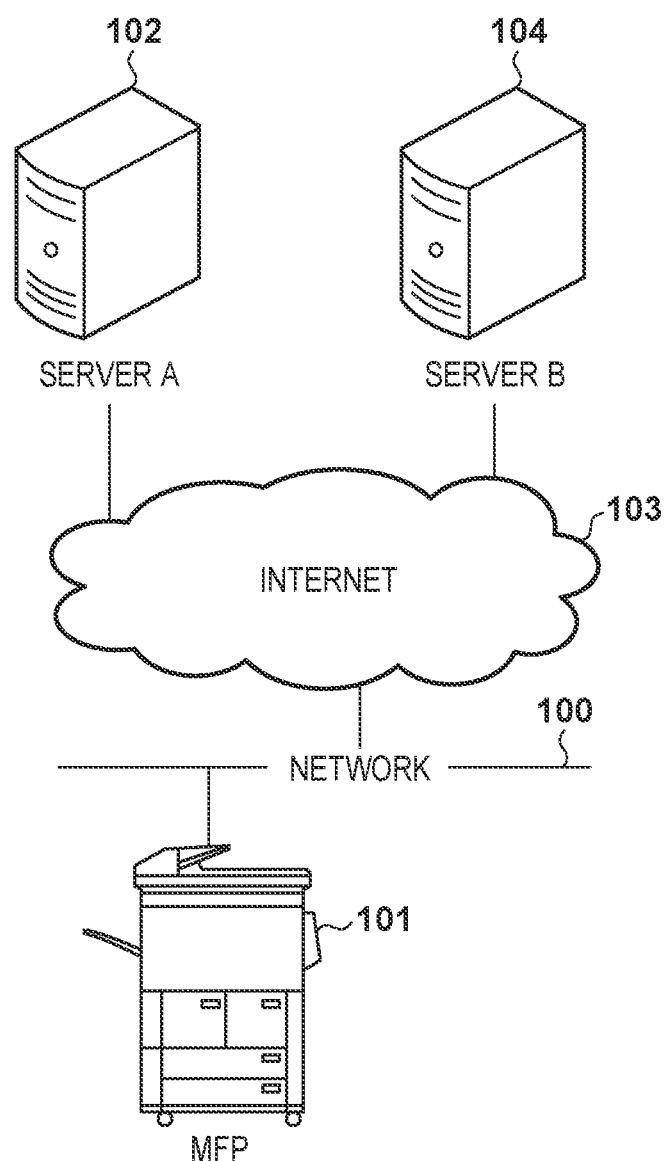
FIG. 1 is an overall view of a system in which an image processing apparatus is used in an embodiment of the present invention.

FIG. 1 is an example configuration of a system using an image processing apparatus in the present invention. The present system is configured from a multi function peripheral (MFP) 101 connected to the Internet 103 via a network 100, and a server A 102 and a server B 104 which are connected to the Internet 103. The network 100 is a base for performance of communication between the respective apparatuses, and is connected to the Internet 103. So long as the MFP 101 has a Web browser or a WebView function, it is not limited to an MFP. Additionally, the MFP 101 may be managed by a local IP address. In such a case, a gateway (not shown) between the network 100 and the MFP 101 is present, and the gateway performs address translation. For example, a router is included in the gateway. Also, the gateway and the MFP 101 may comprise a firewall function. The server A 102 and the server B 104 have functions for distributing Web content via a network, and return Web content in accordance with a request from the MFP 101. In the Web content, scripts that are executed on the client are included. It is not necessarily required that each apparatus and the network 100 be connected to the Internet 103, and they may exist on a local network.

Information Processing Apparatus Configuration Example

Figure 2:
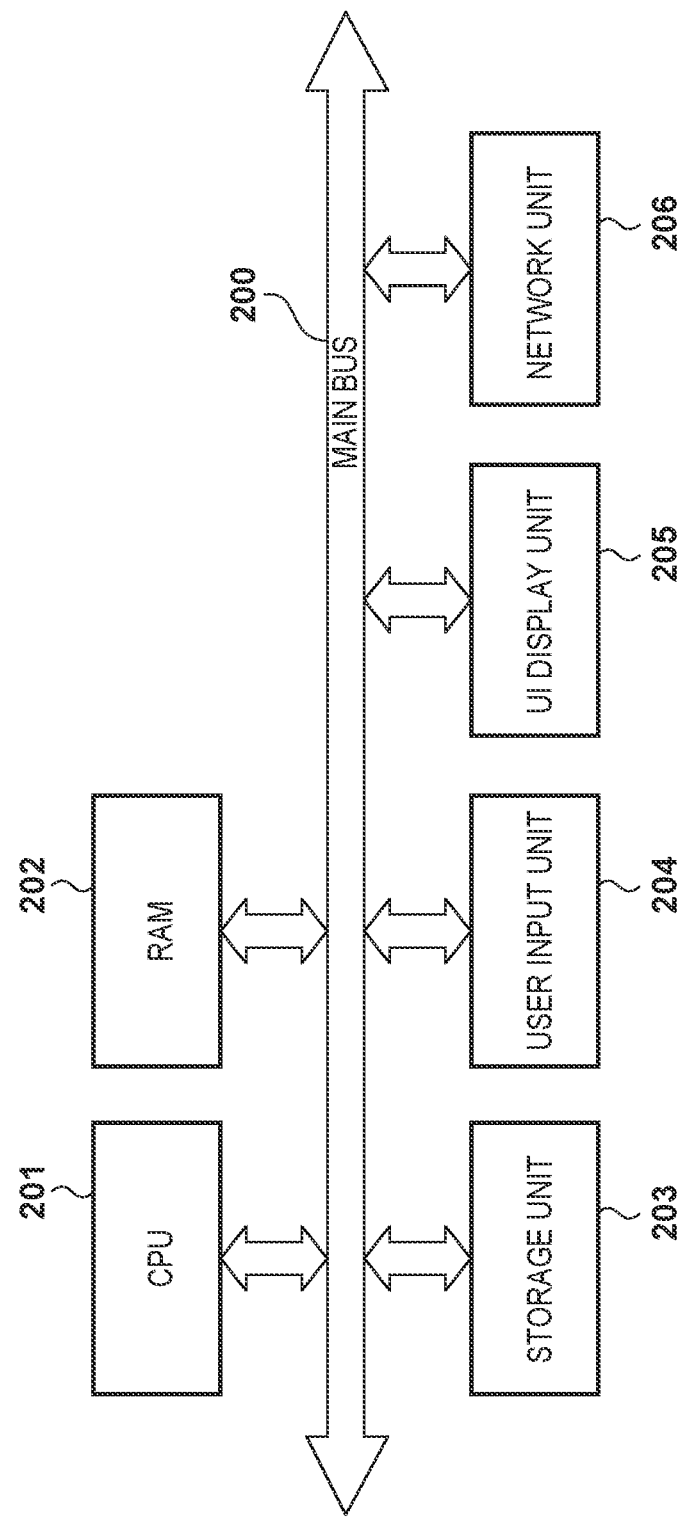
FIG. 2 is a hardware configuration view of the image processing apparatus in the embodiment of the present invention.

FIG. 2 is an example of a device configuration view of an information processing apparatus such as the MFP 101, the server A 102, the server B 104 or the like of the present embodiment. Note that regarding the MFP 101, other than the configuration illustrated in FIG. 2, configuration elements for image reading, printing or the like are included, and the MFP and information processing apparatus, for which these are omitted in the view, include a CPU 201 that executes programs including an operating system, applications, and scripts in addition to programs according to embodiments. Also, a RAM 202 that provides to the CPU 201 a work area for storing programs to be executed, data and the like, and a storage unit 203 (an HDD, an SSD, an NVRAM, or the like) for storing programs according to embodiments and various settings are included. Additionally, a user input unit 204 for a user to perform input of commands, a UI display unit 205 for performing display of screens such as a user interface screen, a network unit 206 for performing communication with another apparatus over a network, and a main bus 200 for connecting each of the configuration elements are included in the MFP and the information processing apparatus. Note that while there is no particular limitation, in the MFP 101, the server A 102, and the server B 104, the CPU 201 controls the RAM 202, the storage unit 203, the user input unit 204, the UI display unit 205, and the network unit 206 via the main bus 200. Also, the UI display unit 205 may also serve as the user input unit 204 as with a touch panel display. However, it may be that the server A 102 and the server B 104 do not have the user input unit 204 or the UI display unit 205. Also, it may be that in the MFP 101, an image reading unit or an image printing unit are additionally connected to the main bus 200. Note that the MFP has a configuration that is common to that of the information processing apparatus as described above, and therefore there are cases where the MFP is referred to as an information processing apparatus.

Software Configuration Example

Figure 3:
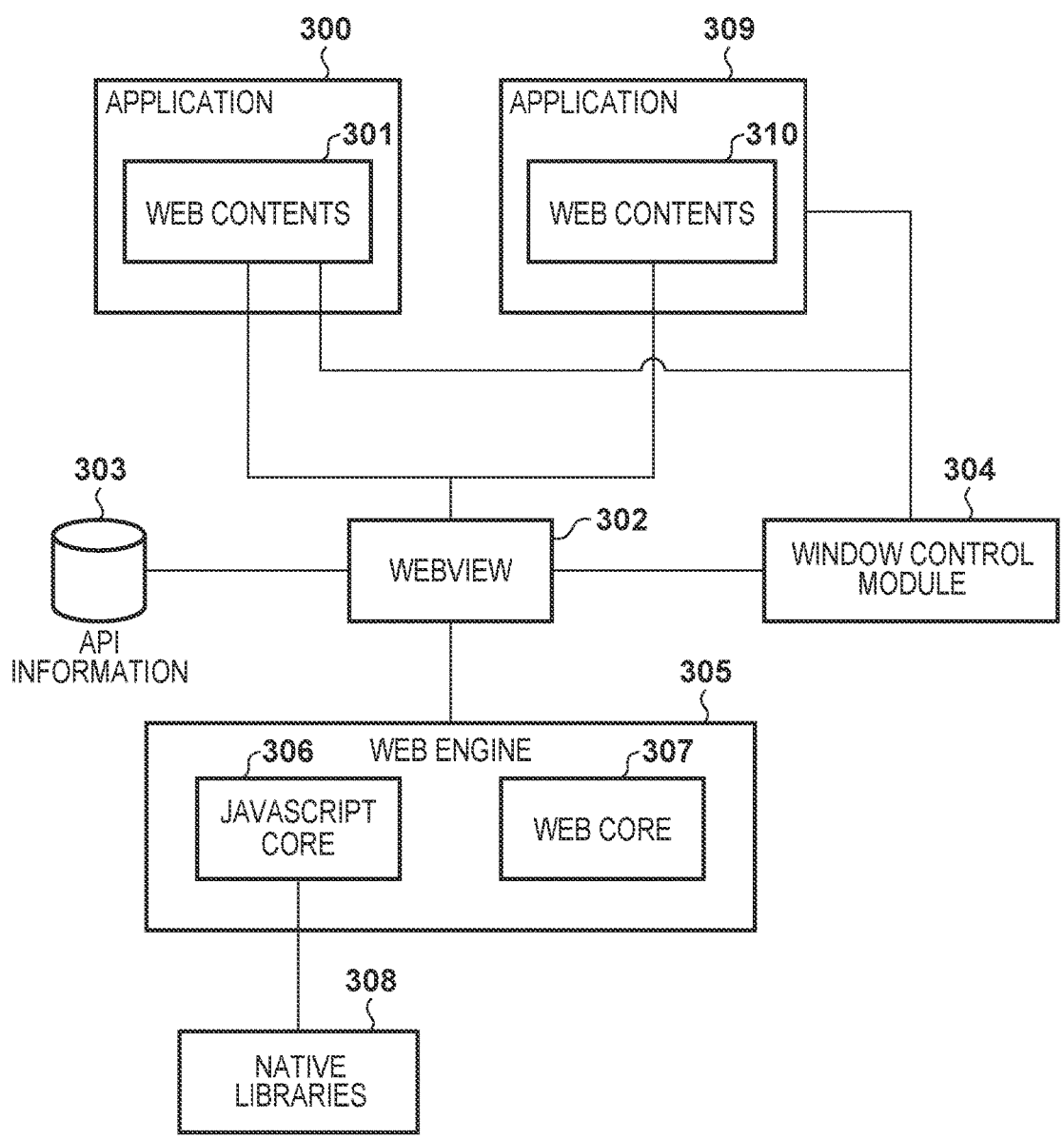
FIG. 3 is a configuration diagram of system software in the embodiment of the present invention.

FIG. 3 is a view for describing a software configuration implemented on the MFP 101 in the present embodiment. Each functional unit illustrated in FIG. 3 is realized by the CPU 201 in the MFP 101 executing a program. An application A 300 and an application B 309 obtain Web content A 301 and Web content B 310 from the server A 102 and the server B 104 via the network unit 206 which is a module for performing communication by an HTTP protocol. The obtained Web content A 301 and Web content B 310 can be displayed by a WebView 302 which the application A 300 and the application B 309 share. The WebView 302 can be called a Web browser that can be used from each application.

The Web content A 301 and the Web content B 310 are operation screens for display on a screen of the MFP 101, for example. Also, it is possible to execute a device function (not shown) of the MFP 101 based on input information from the user inputted via the operation screen, for example. This is realized by enabling libraries for device functions to be used from scripts by a binding function that will be described later. The WebView 302 uses a Web engine 305 to render the Web content A 301 and the Web content B 310, and can display a result thereof. The Web engine 305 has a Web core 307 for rendering HTML included in the Web content A 301 and the Web content B 310, and a JavaScript core 306 for interpreting and executing JavaScript (registered trademark. Hereinafter the indication that it is a registered trademark will be abbreviated) as configuration elements. The JavaScript core 306 has a function, as a native function, for interpreting JavaScript and executing native libraries 308. Also, there is a binding function for binding JavaScript and native libraries (for example, Java classes, C functions, or the like) in accordance with commands from the application A 300 and the application B 309. When each application uses the binding function, the WebView 302 manages as API information 303 information of a native API and information of JavaScript that is bound. The WebView 302 can execute commands that are not wasteful in relation to the JavaScript core 306 by management that includes a binding state in the API information 303. That is, the WebView 302 can execute a suitable command as appropriate in relation to the JavaScript core 306. Also, the WebView 302 can cooperate with a window control module 304 for managing application display states of each application to know respective display states of applications.

The MFP 101 has a platform including an engine (not shown) for executing applications written in Java (registered trademark). Additionally, among the configuration elements illustrated in FIG. 3, the WebView 302, the API information 303, the Web engine 305, and the native libraries 308 are included in that platform. Furthermore, the window control module 304 may also be included in that platform. If the application A 300 and the application B 309 are written in Java (registered trademark), the MFP 101 can execute the applications via the platform. An executed application can cause Web content to be displayed using the WebView 302, and can permit the use of Java objects by JavaScript included in the Web content.

Note that the Web content described above is not limited to something that the server A 102 or the server B 104 provide. Similarly, embodiments of the server A 102 and the server B 104 are not limited to Web servers that transmit/receive requests/responses in accordance with an HTTP protocol. Also, the native libraries 308 that the JavaScript core 306 binds are not limited to specific languages such as Java or C.

Example of Code of Application and Script

FIG. 4 is an example of Java code that the application A 300 binds to the JavaScript core 306 in an embodiment of the present invention. The application A 300 passes, as in the example illustrated in FIG. 4, an identifier of the application A 300 itself, that is identification information; URL information by which Web content A which is to be displayed in the WebView 302 is obtained; Java class information; and JavaScript information as arguments when making a command to the WebView class. The WebView 302 executes a binding command to the JavaScript core 306 based on the information received. Note that the URL is also referred to as read destination information indicating a read destination, or obtainment destination information indicating an obtainment destination. The read destination information is information including an origin of the Web content, such as a URL or a URI, for example. To simply describe the code of FIG. 4, the block that starts from the first line and the second line is a definition of an object class that can be used from JavaScript in the application A 300. In this example, a changeAdminPwd method of the TestClass class is defined. On the final line of FIG. 4, the addJavascriptInterface method is being called on the WebView class, and a JavaScript object that can communicate mutually between JavaScript (registered trademark) and Java is generated. Also, a table (Hereinafter, also referred to as a binding table. Refer to FIG. 6) that associates JavaScript and a native functions, that is Java classes which are bound by execution of this method, is generated. The description in the brackets is the arguments, and these are, in order from the head, an application identifier, URL information, Java class information that can be used from JavaScript, and a global variable for accessing the generated object from JavaScript. If only binding is the objective, the parameters may simply be Java class information that can be used from JavaScript, and a global variable for accessing the generated object from JavaScript. The application identifier and the URL information are information required in order to generate the data table of FIG. 6.

JavaScript need only to call a method corresponding to the Test object in order to execute the Java TestClass.changeAdminPwd method, by execution of the code of FIG. 4. Note that in the present embodiment it is described that parameters are added to the addJavascriptInterface method, and a data table generation function is added, but the generation of the data table may be realized by another method. In such a case, the addJavascriptInterface method may be left unchanged. The arguments of the method to be added newly may be the same as the arguments of the addJavascriptInterface method illustrated in FIG. 4.

FIG. 5 is an example of the JavaScript code included in the Web content A 301 in the embodiment of the present invention. For the Web content A 301, JavaScript is executed as in the example description of FIG. 5. That is, the first line of FIG. 5 is a call of a script, and is written in HTML, for example. Here, changePassword is being called with "123" as an argument. The script changePassword is defined from the second line. Firstly, the script language is JavaScript, and the script is written such that there is a function of the name changePassword, and therein the changeAdminPwd method of the Java TestClass object defined as a class that can be read in JavaScript in FIG. 4 is called with a string as an argument. However, in the script, Test.changeAdminPwdTest is called using the name Test which is set in the webView.addJavascriptInterface method. In this way, at the time of JavaScript execution, the JavaScript core 306 can execute the Java class that is bound in FIG. 4.

Data Table Example

FIG. 6 is an example of a data table of the API information 303 illustrated in FIG. 3 in the embodiment of the present invention. A data table 600 is generated by the webView.addJavascriptInterface method illustrated in FIG. 4, for example, but may be generated by a method for data table generation. In the registration information of the data table 600 each application identifier for determining the application for which the data is registered, the URL information which is the destination for obtaining the Web content displayed by each WebView, JavaScript (registered trademark) and Java information that is bound, and a binding state 601 are included. The two types of bind/unbind exist for the binding state 601, and based on this information, the WebView 302 executes a bind command or an unbind command in relation to the JavaScript (registered trademark) core 306. For example, when the application A 300 implements code illustrated in FIG. 4, the WebView 302 by execution thereof registers the necessary information in the data table 600 of the API information 303. Note that the group of elements of the data table illustrated here is an example, and the content of elements is not limited. By the data table (or binding table) illustrated in the example in FIG. 6, an application, a source URL of the Web content that is displayed, Javascript, and a native function (Java object) are associated, and also it is possible to manage a binding state.

Note that at a time of generation of the binding table 600, the application identifier and the URL which are arguments of the webView.addJavascriptInterface method are copied for the application identifier and the URL items. For the JavaScript item, JavaScript including a variable name ("Test" of FIG. 4) for accessing the generated object from JavaScript, which is an argument of the webView.addJavascriptInterface method, is searched, and the corresponding JavaScript name is registered. For the Java item, the class name ("TestClass" in FIG. 4) which is an argument of webView.addJavascriptInterface method is registered. For the binding state 601, a value that indicates a bound (binding is valid) state, for example "bind", is set.

Note that in the present embodiment, it may be that the data table 600 does not include the URL item.

<Processing for when Application Goes from Displayed State to Non-Displayed State>

Figure 7:
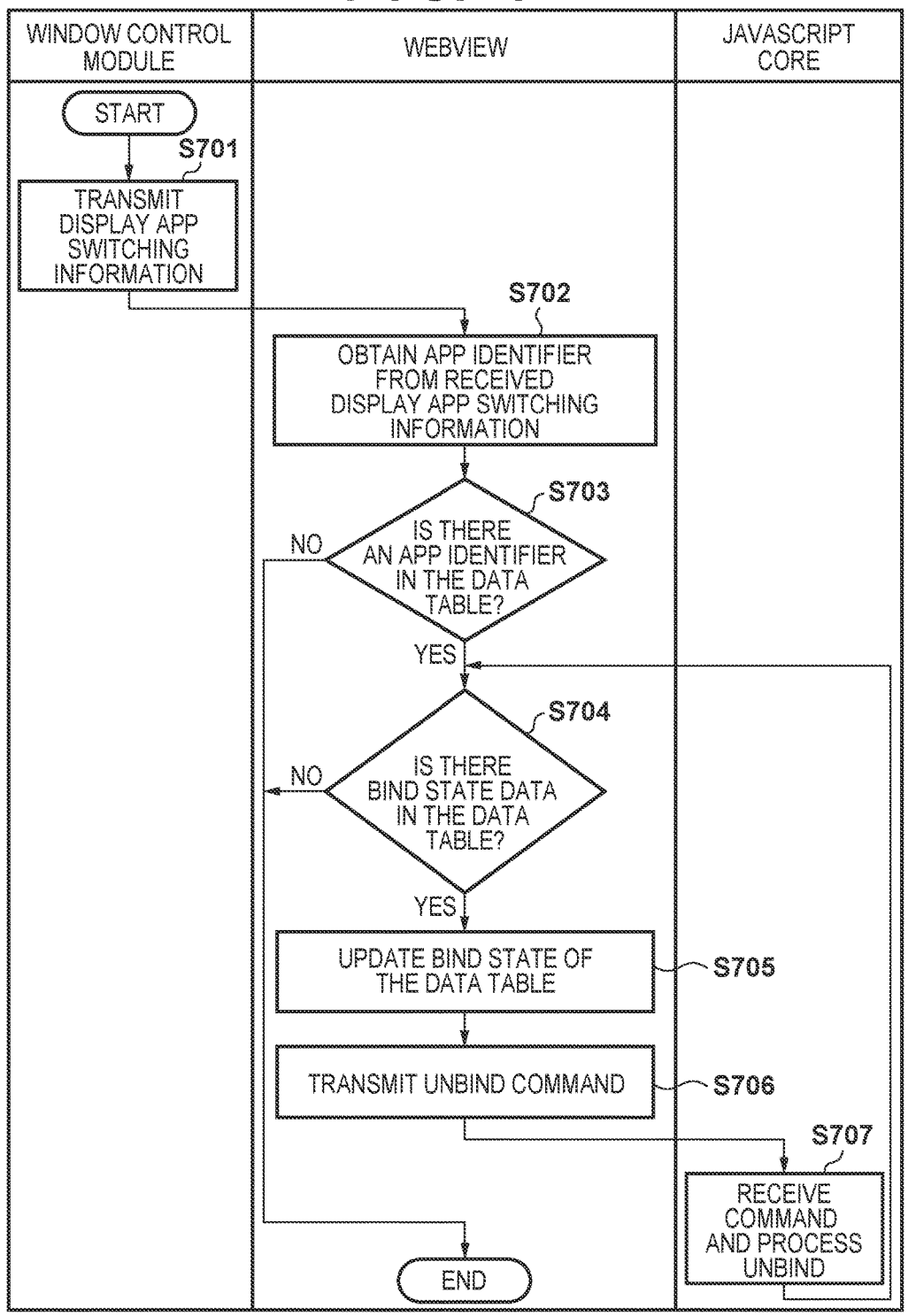
FIG. 7 is a flowchart illustrating a flow of unbinding accompanying an application non-display in an embodiment of the present invention.

FIG. 7 is a flowchart illustrating a flow in which the WebView 302 detects that the application 300 in the embodiment of the present invention enters a non-displayed state, and an API managed in association with the application 300 which is in a bind state is put into an unbind state. When the application 300, which is being displayed on the MFP 101, transitions from the displayed state to the non-displayed state by an MFP operation of a user, the processing starts. Note that in the MFP 101, if a plurality of applications are being executed, only the screen of an active application that is selected is displayed, and the screens of other applications are not displayed. Accordingly, it is identified whether or not an application is active by its display state. The window control module 304 can monitor information indicating the display state of the application, and obtain the display state by accessing that information. Then, if there is a display state transition, that is detected. In FIG. 7, a detection of the display state is made to be a trigger.

In step S701, the window control module 304 notifies to the WebView 302 information indicating that the application which is being displayed on the MFP 101 switched, and processing advances to step S702. Note that information (including an application identifier) for determining that there was a switch from one application to another application is included in this notification.

In step S702, the WebView 302 interprets the received application switching information, and extracts an identifier of an application that enters the non-displayed state, and the processing advances to step S703.

In step S703, the WebView 302 determines whether or not there is information associated with the identifier of the application that enters the non-displayed state in the data table 600 within the API information 303. If there is information associated with the identifier of the application that enters the non-displayed state, the processing proceeds to step S704. If there is no associated information, the processing terminates.

In step S704, the WebView 302 references the binding state 601 associated with the identifier of the application that enters the non-displayed state in the data table 600. If the binding state 601 associated with the corresponding application identifier is in the bind state, the processing proceeds to step S705. If not in the bind state, the processing terminates.

In step S705, the WebView 302 changes the binding state 601 associated with that data of the data table from bind to unbind, and the processing advances to step S706.

In step S706, the WebView 302 transmits an unbind command to the JavaScript core 306, and the processing advances to step S707.

In step S707, the JavaScript core 306 executes unbind processing based on the received command, and the processing terminates. By execution of the unbind processing, the binding between the script executed by the webView.addJavascriptInterface method and the native function (that is, the API) is released, and the native function ceases to be usable from the script. For example, in the application 300, the TestClass object, by the webView.addJavascriptInterface method of FIG. 4, is added as an object that can be used from JavaScript by the name Test (that is to say it is bound). In step S707, this binding is released, and, for example, the object Test, which can be used from a script, is deleted and ceases to be usable by the application A 300. As a consequence, it is advantageous that the application identifier and the Java object name be transmitted to the JavaScript core 306 as parameters of the unbind command in step S707.

<Processing for when Application Goes from Non-Displayed State to Displayed State>

Figure 8:
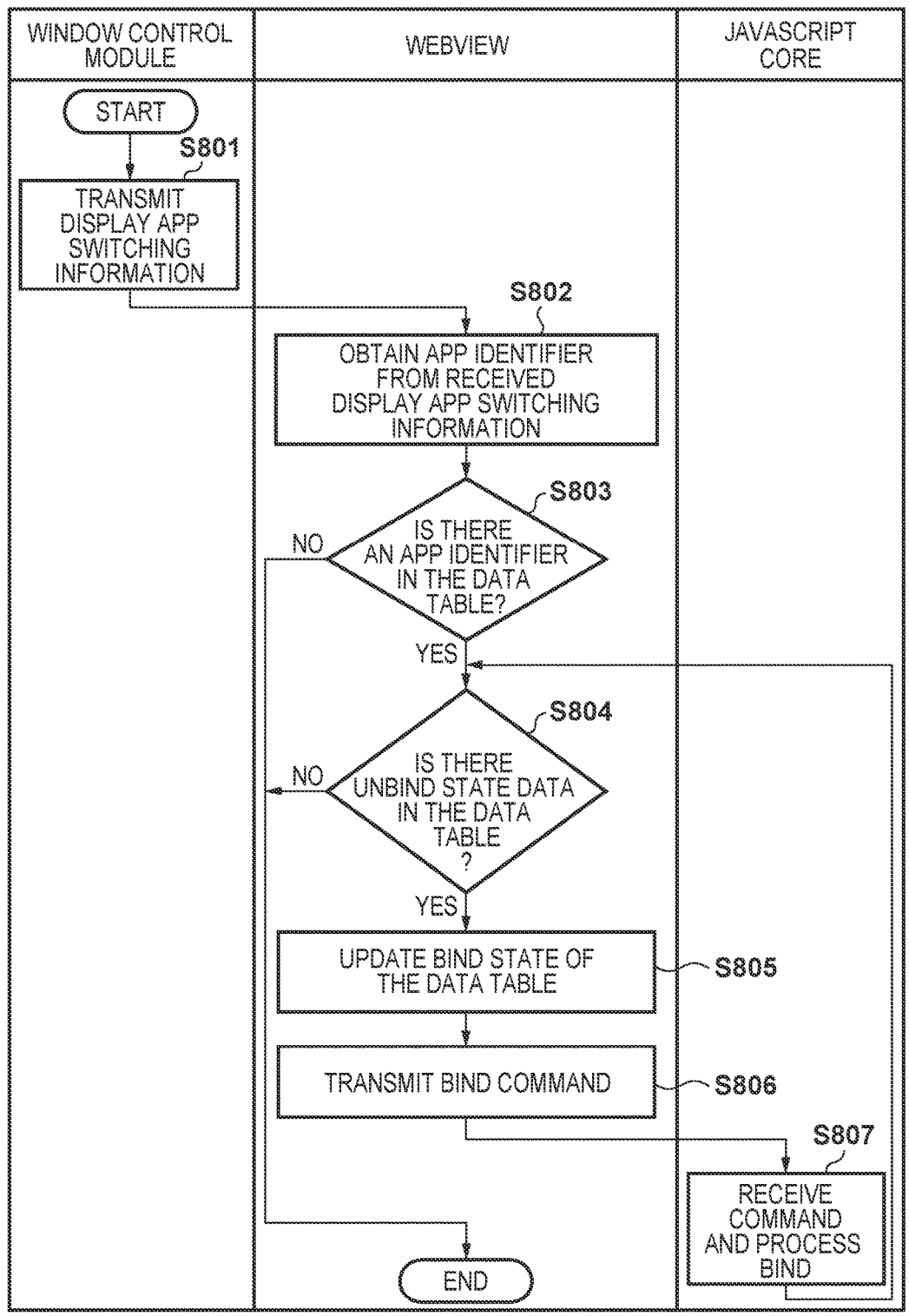
FIG. 8 is a flowchart illustrating a flow of rebinding accompanying an application redisplay in an embodiment of the present invention.

FIG. 8 is a flowchart illustrating a flow in which the WebView 302 detects that the application 300 in the embodiment of the present invention enters the displayed state, and the API managed in association with the application 300 which is in the unbind state is put into the bind state. When the application 300, which is being displayed on the MFP 101, transitions from the non-displayed state to the displayed state by a user operation, the processing starts.

In step S801, the window control module 304 notifies to the WebView 302 information indicating that the application which is being displayed on the MFP 101 switched, and processing advances to step S802. Note that information (including an application identifier) for determining that there was a switch from one application to another application is included in this notification.

In step S802, the WebView 302 interprets the received application switching information, and extracts an identifier of an application that entered the displayed state, and the processing advances to step S803.

In step S803, the WebView 302 determines whether or not there is related information associated with the identifier of the application that enters the displayed state in the data table 600 within the API information 303. If there is information associated with the identifier of the application that enters the displayed state, the processing proceeds to step S804. If there is no associated information, the processing terminates.

In step S804, the WebView 302 references the binding state 601 associated with the identifier of the application that enters the non-displayed state in the data table 600. If the corresponding binding state 601 is the unbind state, the processing advances to step S805. If not in the unbind state, the processing terminates.

In step S805, the WebView 302 changes the binding state 601 associated with that data of the data table from unbind to bind, and the processing advances to step S806.

In step S806, the WebView 302 transmits a bind command to the JavaScript core 306, and the processing advances to step S807.

In step S807, the JavaScript core 306 executes binding processing based on the received command, and the processing terminates. The processing of step S807 may be the same processing as the processing executed by the webView.addJavascriptInterface method. However, the data table 600 of FIG. 6 is already generated previously, and so there is no need to newly generate it.

By the configuration and procedures described above, limited to when an application is in the displayed state, binding between JavaScript and a Java object (that is an API) set by that application is maintained in the present embodiment. When the application enters the non-displayed state, the binding is released. Accordingly, use of a Java object, that is a native function, by JavaScript can be permitted limited to cases where the application that set the binding is in the displayed state. In this way it is possible to, depending on the state of an application, control, by a simpler method, binding between a native function and JavaScript (registered trademark) using a WebView. Accordingly, it is possible to prevent use of a native function by a malicious script, and thereby it is possible to improve security.

Second Embodiment

FIG. 9 is an extension data table 900 that extends the data table 600 of the API information 303 illustrated in FIG. 6 in order to improve convenience of application implementation in embodiments of the present invention. As a typical security protection method, unbinding processing in relation to the JavaScript core 306 is performed because an obtainment destination URL of the Web content itself changes if, for example, the application A 300 displays the Web content B 310 which is different to the Web content A 301 to the WebView 302. Accordingly, for the application 300, convenience is low because every time binding processing is performed as necessary.

Thus, the Java code that the application A 300 binds to the JavaScript core 306 as exemplified in FIG. 4 is extended to add a usage permission flag (or usage permission information) 901 (true/false) in relation to the same origin as an argument for when binding. The origin means a combination of a scheme (for example, http), a host (for example, appA.com), and a port (for example, 80) which are designated when obtaining Web content or the like from a server or the like. Origins for which this combination is the same is referred to as the same origin. Note that the default port is assumed to be the port of the origin in cases where the port is not clearly shown for schemes for which a default port is designated. When the Web content obtainment destination URL displayed on the WebView 302 changes, if data of the same origin as the Web content obtainment destination URL is present in the extension data table 900, and the usage permission flag 901 in relation to the same origin is true, the WebView 302 adds new data based on that data (for example, adds data 903 based on data 902), and executes binding processing in relation to the JavaScript core 306. That is, the usage permission flag indicates that the native function associated with the obtainment destination URL is usable even from scripts obtained from a second obtainment destination URL of the same origin to the obtainment destination URL registered in the table data 600. Note that, the origin is identified from the designated URL, for example, and if that origin matches the origin identified from the URL registered in the data table 900, they are determined to be of the same origin. Meanwhile, if the same origin data is not present, or the same origin data is present but the usage permission flag 901 in relation to the same origin is false, the data is not added.

Figure 10:
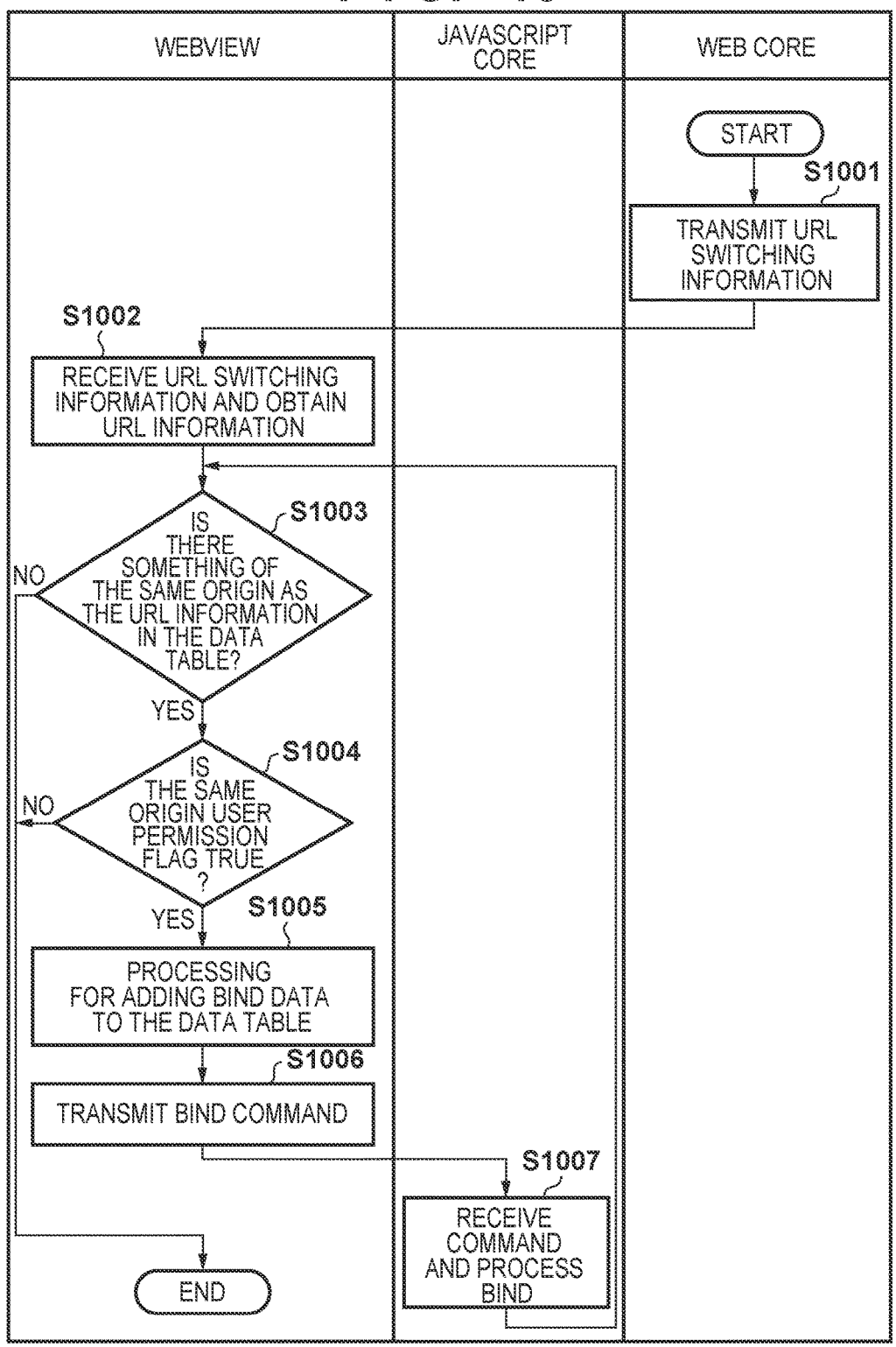
FIG. 10 is a flowchart illustrating a flow of automatic binding using an example of an extension of API information illustrated in FIG. 9 in the embodiment of the present invention.

FIG. 10 is a flowchart for automatic binding that uses the extension data table 900 which is content of the API information 303 illustrated in FIG. 9 in embodiments of the present invention. Unlike FIG. 7 and FIG. 8, processing starts upon the obtainment destination URL changing, due to a user operation, for the Web content being displayed in the WebView 302 on the application A 300 in order to display Web content other than the Web content A 301, rather than the display state of the application A 300 itself, which is being displayed on the MFP 101, changing.

In step S1001, the Web core 307 notifies information to the WebView 302 that the URL for obtaining Web content that is displayed is switched, and the processing advances to step S1002.

In step S1002, the WebView 302 obtains the new URL information that is switched to from received information, and the processing advances to step S1003.

In step S1003, the WebView 302, based on obtained URL information, executes a comparison of the origin identified from the URL and origin identified from URLs in the data group in the data table 900, and determines whether data of the same origin is present. If present, the processing advances to step S1004, and if not present, the processing terminates.

In step S1004, the WebView 302 references the usage permission flag 901 associated with the URL of the same origin determined in the previously described step, and if it is true, the processing advances to step S1005, and if it is false, the processing terminates.

In step S1005, the WebView 302 copies data for which the usage permission flag is true and that corresponds to the same origin described previously, substitutes the URL information of the data that is copied into the new URL obtained in 1002, and performs processing for adding a new entry to the data table 900, and then the processing advances to step S1006.

In step S1006, the WebView 302 transmits a bind command to the JavaScript core 306 based on information for which the add processing was performed, and the processing advances to step S1007.

In step S1007, the JavaScript core 306 executes binding processing and the processing terminates.

Note that setting of a value of the usage permission flag 901 of the extension data table 900 can be freely set to true/false by implementation as a webView method, for example. Also, to maintain security, a usage permission flag 901 may be set uniformly to prohibited, that is to false, for the newly generated extension data table 900.

Also, step S1006 and step S1007 are examples of a case where the binding state is bind, but if the binding state is unbind, processing may terminate after step S1005 terminates.

Note that as another embodiment, a form in which an object (instance) of the Web engine 305 that is associated is discarded (execution of a discard command in relation to the Web engine 305 in step S702 when the application becomes non-displayed), based on an application identifier for which the WebView 302 entered the non-displayed state in FIG. 7 is also possible.

By the configuration illustrated above, it becomes possible to use a native function bound to JavaScript limited to the case when the application that uses the WebView is being displayed in the foreground in accordance with the display state of the application that uses the WebView. Also, it becomes possible to automatically bind on the system side if it is the same origin in cases where the application state does not change but an obtainment destination of the Web content displayed on the WebView changes. By this, guarantee of security for each application in a simpler form becomes possible, and also convenience can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230027, filed Nov. 25, 2015 which is hereby incorporated by reference herein in its entirety.

What is claimed is:

1. An information processing apparatus that can provide security for a native function to be used by a script obtained by an application being executed, the information processing apparatus comprising:
   at least one processor and at least one memory coupled to each other and cooperating to act as:
   (1) a storage unit configured to store a table that associates (a) application identification information that identifies an application, (b) a native function to be used by a script obtained by the application, and (c) a binding state that indicates whether or not the native function is usable by the script obtained by the application, wherein the table stores identification information of the application, the native function, and the binding state for each application;
   (2) a detection unit configured to detect switching of display between applications being executed;
   (3) a first identification unit configured to identify a first application transitioned from a displayed state to a non-displayed state, based on the switching of display detected by the detection unit;
   (4) a first determination unit configured to determine, in the table, whether the binding state of the first application identified by the first identification unit indicates that the native function is usable;
   (5) a first update unit configured to update the table by changing a value of the binding state associated with the first application to a value indicating that the native function is not usable in a case where it is determined by the first determination unit that the binding state of the first application identified by the first identification unit indicates that the native function is usable;
   (6) a first change unit configured to change a state of the native function associated with the table to an unusable state by the script obtained by the first application in a case where it is determined by the first determination unit that the binding state of the first application identified by the first identification unit indicates that the native function is usable;
   (7) a second identification unit configured to identify a second application transitioned from a non-displayed state to a displayed state, based on the switching of display detected by the detection unit;
   (8) a second determination unit configured to determine, in the table, whether the binding state of the second application identified by the second identification unit indicates that the native function is usable;
   (9) a second update unit configured to update the table by changing a value of the binding state associated with the second application to a value indicating that the native function is usable in a case where it is determined by the second determination unit that the binding state of the second application identified by the second identification unit indicates that the native function is not usable; and
   (10) a second change unit configured to change a state of the native function associated with the table to a usable state by the script obtained by the second application in a case where it is determined by the second determination unit that the binding state of the second application identified by the second identification unit indicates that the native function is not usable.

2. The information processing apparatus according to claim 1, wherein the table further includes (a) an obtainment destination for obtainment of the script by an application, and (b) usage permission information indicating that the native function is usable in relation to the script obtained from a second obtainment destination of the same origin as the obtainment destination registered in the table, and
   wherein the at least one processor and the at least one memory further cooperate to act as a registration unit configured to, when the obtainment destination is changed to the second obtainment destination, if the usage permission information associated with the obtainment destination indicates usable, registers, in association in the table, identification information of the application, the native function, a binding state indicating whether or not the native function is usable by the script obtained by the application, and the second obtainment destination.

3. The information processing apparatus according to claim 2, wherein the change unit, when the obtainment destination is changed to the second obtainment destination, if the binding state associated with the obtainment destination indicates usable, changes the binding state to a state in which the native function is usable by the script.

4. The information processing apparatus according to claim 2, wherein the at least one processor and the at least one memory further cooperate to act as a unit configured to obtain Web content including the script from a designated obtainment destination, to monitor for a change of the obtainment destination, and to notify to the registration unit the change of the obtainment destination.

5. The information processing apparatus according to claim 1, wherein the first and second change units and the first and second update units are implemented as a method of WebView.

6. The information processing apparatus according to claim 5, wherein the script is written in JavaScript, and the native function is a class defined in Java.

7. A non-transitory computer readable medium storing a program for causing an information processing apparatus, that can provide security for a native function to be used by a script obtained by an application being executed, to function as:
   (1) a storage unit configured to store a table that associates (a) application identification information that identifies an application, (b) a native function to be used by a script obtained by the application, and (c) a binding state that indicates whether or not the native function is usable by the script obtained by the application, wherein the table stores identification information of the application, the native function, and the binding state for each application;
   (2) a detection unit configured to detect switching of display between applications being executed;
   (3) a first identification unit configured to identify a first application transitioned from a displayed state to a non-displayed state, based on the switching of display detected by the detection unit;
   (4) a first determination unit configured to determine, in the table, whether the binding state of the first application identified by the first identification unit indicates that the native function is usable;
   (5) a first update unit configured to update the table by changing a value of the binding state associated with the first application to a value indicating that the native function is not usable in a case where it is determined by the first determination unit that the binding state of the first application identified by the first identification unit indicates that the native function is usable;
(6) a first change unit configured to change a state of the native function associated with the table to an unusable state by the script obtained by the first application in a case where it is determined by the first determination unit that the binding state of the first application identified by the first identification unit indicates that the native function is usable;
(7) a second identification unit configured to identify a second application transitioned from a non-displayed state to a displayed state, based on the switching of display detected by the detection unit;
(8) a second determination unit configured to determine, in the table, whether the binding state of the second application identified by the second identification unit indicates that the native function is usable;
(9) a second update unit configured to update the table by changing a value of the binding state associated with the second application to a value indicating that the native function is usable in a case where it is determined by the second determination unit that the binding state of the second application identified by the second identification unit indicates that the native function is not usable; and
(10) a second change unit configured to change a state of the native function associated with the table to a usable state by the script obtained by the second application in a case where it is determined by the second determination unit that the binding state of the second application identified by the second identification unit indicates that the native function is not usable.

8. A method for controlling an information processing apparatus that can provide security for a native function to be used by a script obtained by an application being executed, the method comprising:
(1) storing a table that associates (a) application identification information that identifies an application, (b) a native function to be used by a script obtained by the application, and (c) a binding state that indicates whether or not the native function is usable by the script obtained by the application, wherein the table stores identification information of the application, the native function, and the binding state for each application;
(2) detecting switching of display between applications being executed;
(3) first identifying a first application transitioned from a displayed state to a non-displayed state, based on the switching of display detected in the detecting;
(4) first determining, in the table, whether the binding state of the first application identified in the first identifying indicates that the native function is usable;
(5) first updating the table by changing a value of the binding state associated with the first application to a value indicating that the native function is not usable in a case where it is determined in the first determining that the binding state of the first application identified in the first identifying indicates that the native function is usable;
(6) first changing a state of the native function associated with the table to an unusable state by the script obtained by the first application in a case where it is determined in the first determining that the binding state of the first application identified in the first identifying indicates that the native function is usable;
(7) second identifying a second application transitioned from a non-displayed state to a displayed state, based on the switching of display detected in the detecting;
(8) second determining, in the table, whether the binding state of the second application identified in the second identifying indicates that the native function is usable;
(9) second updating the table by changing a value of the binding state associated with the second application to a value indicating that the native function is usable in a case where it is determined in the second determining that the binding state of the second application identified in the second identifying indicates that the native function is not usable; and
(10) second changing a state of the native function associated with the table to a usable state by the script obtained by the second application in a case where it is determined in the second determining that the binding state of the second application identified in the second identifying indicates that the native function is not usable.

* * * * *